United States Patent Office 3,642,836
Patented Feb. 15, 1972

3,642,836
N-[2-(2-METHYL-5-NITRO-1-IMIDAZOLYL)
ETHYL]IMIDES
John W. Cusic, Skokie, and Ernest F. Levon, Evanston, Ill., assignors to G. D. Searle & Co., Chicago, Ill.
No Drawing. Filed Feb. 3, 1969, Ser. No. 796,225
Int. Cl. C07d 29/20
U.S. Cl. 260—281                                    3 Claims

ABSTRACT OF THE DISCLOSURE

Imides having a nitroimidazolyethyl group as a N-substituent are described herein. They are anti-bacterial and anti-protozoal agents. The compounds are prepared by the reaction of the appropriate imide with the chloroethyl-imidazole or with the tosylate of the corresponding hydroxyethyl compound.

The present invention relates to a group of N-substituted imides. In particular, it release to a group of compounds having the following general formula

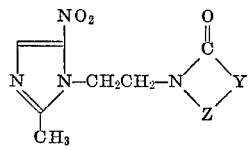

wherein Y is selected from the group consisting of alkylene, alkenylene, arylene and

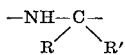

wherein R and R' are each selected from the group consisting of lower alkyl and phenyl; and Z is selected from the group consisting of carbonyl and sulfonyl. When Z is carbonyl, an imide structure results.

The alkylent and alkenylene radicals referred to above contain from 2 to 5 carbon atoms. In these radicals, at least two carbon atoms separate the free valences. Preferably, 2 to 3 carbon atoms separate the free valences so that when the radicals are combined with the imide structure, for example, a 5- or 6-membered ring results. Some examples of alkylene and alkenylene groups are ethylene, trimethylene, and vinylene. Thus, when Z is carbonyl and Y is each of the aforementioned groups, the imides involved are succinimide, glutarimide, and maleimide, respectively. The indicated imides can further contain one or more alkyl substituents to give structures such as 2-methylsuccinimide and 3,3-dimethylglutarimide. The alkyl substituents can further be combined to give a spiro imide structure. An example of this type of structure is 1,1-cyclohexanediacetimide.

When Y is arylene, radicals having two free aromatic valences are involved. Examples of Y thus are phenylene and naphthalenediyl. Examples of imides involved are phthalimide, naphthalimide, 1,2-naphthalenedicarboximide, and 2,3-naphthalenedicarboximide. The benzene and naphthalene rings in the aforementioned imides can further be substituted with one or more alkyl groups such as methyl, with one or more halogen atoms such as chlorine, or with nitro. Y can further represent pyridinediyl so that derivatives of quinolinimide are involved. When Y in the above structure is phenylene, Z can also be sulfonyl to give derivatives of o-sulfobenzimide.

When Y in the above formula is

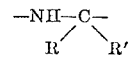

and Z is carbonyl, then

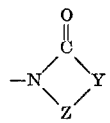

is a 5,5-disubstituted hydantoin. Preferred substituents are lower alkyl radicals containing up to six carbon atoms and phenyl. Examples of such lower alkyl radicals are methyl, ethyl, and propyl. Examples of substituted hydantoins are 5,5-dimethylhydantoin, 5,5-diethylhydantoin, and 5,5-diphenylhydantoin.

The compounds of the present invention are conveniently prepared from a substituted imidazole of the following formula

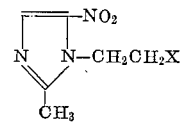

wherein X is chlorine or toluenesulfonyloxy. This compound is reacted with an alkali metal salt, preferably the sodium or potassium salt, of the appropriate imide to give the compounds of the present invention.

Where the compounds of the present invention are imides of dicarboxylic acids, they can be hydrolyzed with base to effect partial opening of the imide structure and give the corresponding amide-carboxylic acid.

The compounds of the present invention are useful because of their anti-biotic activity against a number of organisms. Thus, they inhibit the growth of protozoa such as *Tritrichomonas foetus* and *Trichomonas vaginalis* and they inhibit the growth of bacteria such as *Diplococcus pneumoniae* and *Bacillus subtilis*.

Evidence of the anti-protozoal utility of the present compounds is provided by standardized tests for their capacity to inhibit the growth of *Tritrichomonas foetus* and *Trichomonas vaginalis* which are carried out in the following manner. A modified Diamond medium is prepared by mixing 1200 parts of trypticase (Baltimore Biological Laboratories), 600 parts of yeast extract (Disco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water. The pH is adjusted to 6.8 with 4% sodium hydroxide solution and 30 parts of agar (Baltimore Biological Laboratories) is incorporated. The mixture is boiled for one minute to dissolve the agar and it is then sterilized in an autoclave. To 80 volumes of resultant medium is aseptically added 20 volumes of sterile Dubos medium serum. The resultant medium is inoculated with 1% by volume) of either a 48-hour or a 72-hour culture of *T. foetus* or *T. vaginalis*, whereupon 1 ml. of the inoculated medium is mixed with 10 mg. of test compound. The mixture is incubated anaerobically at 37° C. for 48 hours and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10, and 1 microgram of test compound per ml., and the resultant mixtures are incubated anaerobically as before at 37° C. for 48 hours and then examined microscopically for the presence of motile trichomonads. Controls are provided by concurrent incubations identical with the foregoing except for the absence of test compound. When N-[2-(2-methyl-5-nitro-1-imidazolyl)ethyl] succinimide, 3 - [2-(2-methyl-5-nitro-1-imidazolyl)ethyl]-5,5-diphenylhydantoin, and N-[2 - (2 - methyl-5-nitro-1-imidazolyl)ethyl]-o-sulfobenzimide were tested against *Trichomonas vaginalis* by the above procedure, each inhibited the protozoa at a concentration of 10 micrograms per milliliter or less. Similarly, N-[2-(2-methyl-5-nitro-1-imidazolyl)ethyl]phthalimide, N-[2 - (2-methyl-5-nitro-1-imidazolyl)ethyl]quinolinimide, and N-[2-(2-methyl-5-nitro - 1 - imidazolyl)ethyl]phthalamic acid were tested against *Tritrichomonas foetus* in the above procedure, each inhibited the protozoa at a concentration of 10 micrograms per milliliter or less.

The present compounds can be combined with various known excipients and adjuvants in the form of dusts, solutions, suspensions, ointments, and sprays to provide compositions useful for disinfecting purposes.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

A mixture of 17.0 parts of 1-(2-chloroethyl)-2-methyl-5-nitroimidazole, 18.0 parts of potassium phthalimide, and 2.0 parts of potassium iodide in 240 parts of dimethylformamide is heated in a boiling water bath for 3 hours with stirring. Stirring is then continued for 16 hours at room temperature. The resulting brown mixture is diluted with 870 parts of toluene and the toluene solution is washed with several portions of water. The toluene solution is dried over sodium sulfate and the solvent is evaporated to leave a residue which is digested with cold alcohol. The alcohol solution is then cooled and the precipitate which forms is separated by filtration and recrystallized from ethanol to give N-[2-(2 - methyl-5-nitro-1-imidazolyl)ethyl]phthalimide melting at about 177° C. This compound has the following formula

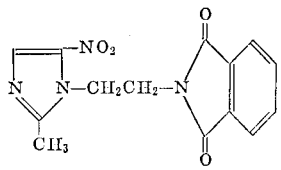

EXAMPLE 2

10.0 parts of succinimide and 6.5 parts of potassium hydroxide are dissolved in 200 parts of methanol. The solvent is then evaporated under reduced pressure to leave a residual white solid. The reaction apparatus is flushed with nitrogen and dimethylformamide is added to the solid. Then, a solution of 32 parts of 1-(2-hydroxyethyl)-2-methyl-5-nitroimidazole tosylate in 145 parts of warm dimethylformamide is added and the mixture is diluted to about 300 parts by volume with dimethylformamide. The mixture is heated to 85–102° C. with stirring for 45 minutes. The solid dissolves and the dark mixture which results is allowed to cool slowly. It is then diluted slowly with 450 parts of toluene. The precipitate which forms is allowed to digest and then an additional 450 parts of toluene is added. The precipitate is removed by filtration and washed with toluene and the toluene-dimethylformamide filtrate is heated under reduced pressure to remove the solvent. A dark residual oil is obtained and this is diluted with acetone to a volume of about 100 parts. Crystallization is then initiated and 35 parts of ether is added to the resultant mixture. The resultant precipitate is separated by filtration, washed with a mixture of acetone and ether and then with ether, and finally vacuum dried to give N-[2-(2-methyl-5-nitro-1-imidazolyl)ethyl] succinimide melting at about 147–148° C.

If the above procedure is repeated using glutarimide in place of the succinimide, the product obtained is N-[2-(2-methyl-5-nitro-1-imidazolyl)ethyl]glutarimide.

EXAMPLE 3

A solution is prepared from 240 parts of methanol, 14 parts of 3,3-dimethylglutarimide, and 6.5 parts of potassium hydroxide. The solvent is evaporated to leave a residual syrup which is mixed with 95 parts of dimethylformamide. Then, a solution of 32 parts of 1-(2-hydroxyethyl)-2-methyl-5-nitroimidazole tosylate in 190 parts of dimethylformamide is added. The mixture becomes dark green-black immediately. It is then stirred and warmed at 90–110° C. for about 1 hour before it is cooled and diluted slowly to a total volume of 100 parts with toluene. The precipitate which forms is removed by filtration and washed. The solvent is evaporated from the toluene-dimethylformamide filtrate under reduced pressure and the residue is dissolved in 80 parts of acetone, diluted with 280 parts of ether, mixed with charcoal, and filtered. The solvent is evaporated from the filtrate under reduced pressure and the residual oil is diluted with 140 parts of ether and made to crystallize. The precipitate which forms is separated by filtration and dried. The solid is then dissolved in an excess of warm acetone and treated with charcoal. The resulting filtrate is diluted with 35 parts of ether and crystallization is initiated. The precipitate which forms is separated by filtration, washed with ether and then with acetone. The resulting filtrate is then concentrated to a volume of 40 parts and cooled. The precipitate which forms is separated by filtration, washed, and then dried to give N-[2-(2-methyl - 5 - nitro - 1 - imidazolyl)-ethyl]-3,3-dimethylglutarimide melting at about 153–154.5° C.

EXAMPLE 4

To a solution of 5.0 parts of quinolinimide in 50 parts of dimethylformamide is added 2.0 parts of potassium hydroxide. The mixture is heated on a steam bath and 15 parts of methanol is added to dissolve the potassium hydroxide. The mixture is then diluted with 50 parts of additional dimethylformamide and the solution is heated under reduced pressure to remove the methanol. To the resulting dimethylformamide solution is added a solution of 10.0 parts of 1 - (2-hydroxyethyl)-2-methyl-5-nitroimidazole tosylate in 95 parts of dimethylformamide. The resulting yellow solution is heated on a steam bath for 1 hours and the solvent is then evaporated under reduced pressure to leave a solid residue. This is triturated with 435 parts of toluene and the insoluble material is separated by filtration. The solid is mixed with 200 parts of water and the insoluble material is separated by filtration and dried to give N - [2 - (2-methyl-5-nitro-1-imidazolyl)ethyl]quinolinimide melting at about 205–213° C. This compound has the following formula

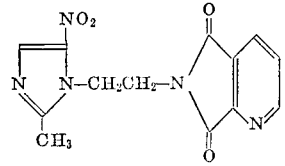

EXAMPLE 5

1.4 parts of 1-(2 - chloroethyl) - 2 - methyl-5-nitroimidazole is mixed with 2.5 parts of the sodium salt of 5,5 - diphenylhydantoin and 75 parts of dimethylformamide is added under nitrogen. The mixture is heated on a steam bath for 1 hour and then 10 parts of methanol is added and heating is continued for an additional 4 hours. The solvent is then evaporated on the steam bath under a stream of nitrogen to leave a residual mixture of solid and oil. The residue is mixed with toluene and filtered to remove some insoluble material. The toluene solution is diluted to a volume of 250 parts and washed with a mixture of 25 parts of sodium bicarbonate and 120 parts of water. The toluene solution is then washed with water and dried over magnesium sulfate and the solvent is evaporated to leave a solid residue. This is digested in warm ether and then cooled and the solid is separated by filtration. The solid is recrystallized from ethanol to give 3 - [2-(2-methyl-5-nitro-1-imidazolyl)-ethyl]-5,5 - diphenylhydantain melting at about 209–210.5° C. This compound has the following formula

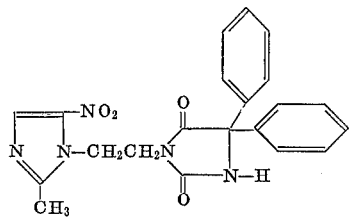

EXAMPLE 6

8.5 parts of 1-(2-chloroethyl) - 2 - methyl - 5 - nitroimidazole is dissolved in 190 parts of dimethylformamide and 7.0 parts of the sodium salt of 5,5-dimethylhydantoin is added. The mixture is allowed to stand for about 5 hours and then filtered to remove a small amount of insoluble material. Part of the solvent is evaporated under reduced pressure and the remaining solution is diluted with toluene and filtered to remove a small amount of new insoluble material. The solvent is then evaporated from the resulting filtrate to leave a residual yellow-brown liquid. The liquid is washed twice by decantation with hexane, dissolved in ether, and treated with charcoal. The solution is then diluted with about 150 parts of benzene and the solvent is evaporated to leave a residual yellow oil. This oil is chromatographed on a silica column using benzene and eluted with solutions containing increasing quantities of ethyl acetate in benzene. After elution with 100% ethyl acetate, elution is continued with increasing quantities of ethanol in ethyl acetate. The fractions obtained by elution of the column with 10% ethanol in ethyl acetate are collected separately and combined, and the solvent is evaporated to leave a residual solid. This is redissolved in methanol, and the solution is filtered, concentrated, and allowed to crystallize. The precipitate which forms is separated by filtration and then dried under vacuum at 78° C. for about 7 hours. The product obtained in this way is 3-[2-(2 - methyl - 5 - nitro - 1 - imidazolyl)ethyl]-5,5-dimethylhydantoin melting at about 138–139° C.

EXAMPLE 7

A solution of 10.0 parts of the sodium salt of o-sulfobenzimide in 95 parts of dimethylformamide is added to a solution of 9.2 parts of 1-(2-chloroethyl)-2-methyl-5-nitroimidazole in 95 parts of water. One part of sodium iodide is added and the mixture is heated at 120–140° C. for about 90 minutes. It is then allowed to stand at room temperature for 16 hours before it is diluted with 870 parts of toluene and washed with water. The toluene solution is dried over sodium sulfate and the solvent is evaporated to leave a residual mixture of solid and syrup. The residue is then digested at room temperature with 70 parts ether. The ether is decanted and the solid is dried and then dissolved in chloroform. Addition of ether to the chloroform solution causes precipitation to take place. The solid which forms is separated, washed and dried. This residue is then heated with 90 parts of chloroform and filtered to remove some insoluble material. The filtrate is then concentrated and ether is added to cause precipitation. The solid which forms is separated by filtration and dried. It melts at about 176–180° C. The product obtained in this way is N-[2-(2-methyl-5-nitro-1-imidazolyl)ethyl]-o-sulfobenzimide and it has the following formula

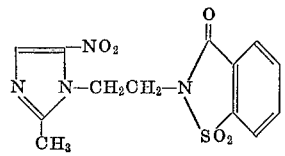

EXAMPLE 8

9.0 parts of 4-nitrophthalimide is dissolved in 200 parts of boiling methanol. The resulting solution is cooled and a solution of 2.9 parts of potassium hydroxide in 80 parts of methanol is added. The potassium salt precipitates immediately and the liquid is removed by evaporation under reduced pressure. The resulting residue is suspended in 240 parts of dimethylformamide and a solution of 15 parts of 1 - (2 - hydroxyethyl)-2-methyl-5-nitroimidazole tosylate in 145 parts of dimethylformamide is added. The resulting mixture is heated on a steam bath for about 75 minutes and then concentrated to a volume of about 100 parts. The mixture is then poured onto ice and the precipitate which forms is separated by filtration. It is then crushed and dried and finally stirred and heated with about 150 parts of ethanol. The solid is again separated by filtration and dried first in the air and then overnight under reduced pressure. The resulting product is N-[2-(2 - methyl-5-nitro-1-imidazolyl)ethyl]-4-nitrophthalimide melting at about 248–250° C. with decomposition.

EXAMPLE 9

To a solution of 8.5 parts of 1,1-cyclohexanediacetimide in 120 parts of methanol is added a solution of 2.9 parts of potassium hydroxide in 80 parts of methanol and then 95 parts of dimethylformamide is added. The methanol is evaporated from the solution under reduced pressure and to the residue is added a solution of 15.0 parts of 1-(2-hydroxyethyl)-2-methyl-5-nitroimidazole tosylate in 140 parts of dimethylformamide. The mixture turns dark and is heated on a steam bath for 1 hour. It is then cooled and diluted with water to a volume of about 600 parts. The precipitate which forms is separated by filtration, washed with water, and air dried. It is then dissolved in a mixture of ethyl acetate and ether and treated with charcoal. The resulting filtrate is concentrated to a volume of about 60 parts and diluted with an equal volume of ether. The precipitate which forms is separated by filtration and recrystallized from a solution of equal volumes of ethyl acetate and ether. The product obtained in this way is N-[2-(2-methyl-5-nitro-1-imidazolyl)ethyl]-1,1-cyclohexanediacetimide melting at about 131–133° C. This compound has the following formula

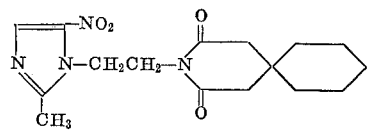

EXAMPLE 10

To a mixture of 5.0 parts of N-[2-(2-methyl-5-nitro-1-imidazolyl)ethyl]phthalimide and 80 parts of methanol is added 7.6 parts by volume of a 2.5 N aqueous sodium hydroxide solution and the mixture is stirred at room temperature. Most of the imide dissolves after about 15 minutes but stirring is continued for an additional 3 hours. The reaction mixture is then diluted with 50 parts of ether, benzene is added, and the solvent is evaporated under reduced pressure. The residual dark oil is taken up in water and acidified with acetic acid. Evaporation of the solvent is again carried out although it is stopped briefly to remove some dark precipitate. On continued evaporation, a crystalline precipitate forms. This is separated by filtration, washed and dried. The solid is then mixed with water and 15 parts by volume of 1 N sodium hydroxide solution under nitrogen. It dissolves slowly to give a dark solution which is filtered to remove some insoluble material. The filtrate is neutralized with dilute acetic acid to give a light orange solution from which a fine powder precipitates. The solid which forms is separated by filtration and the filtrate is acidified with acetic acid. The crystalline precipitate which forms is separated by filtration, washed, and dried in a vacuum. It decomposes at 182–183° C. The product obtained in this way is N-[2-(2-methyl-5-nitro-1-imidazolyl)ethyl] ohthalamic acid and it has the following formula

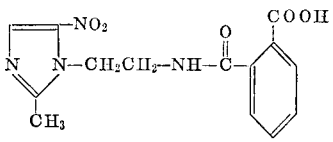

What is claimed is:
1. A compound which has the formula

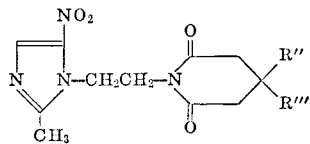

wherein R″ and R‴ are selected from the group consisting of hydrogen and methyl or R″ and R‴ can be combined to give pentamethylene.

2. A compound according to claim 1 which is N-[2-(2 - methyl - 5 - nitro-1-imidazolyl)ethyl]-3,3-dimethyl-glutarimide.

3. A compound according to claim 1 which is N-[2-(2-methyl-5-nitro-1-imidazolyl)ethyl]glutarimide.

References Cited
UNITED STATES PATENTS

| | | | |
|---|---|---|---|
| 3,081,308 | 3/1963 | Kalm | 260—281 |
| 3,320,270 | 5/1967 | Grogan | 260—281 X |
| 3,399,193 | 8/1968 | Giraldi et al. | 260—247.5 |
| 3,417,091 | 12/1968 | Pickholz et al. | 260—288 |

FOREIGN PATENTS

| | | | |
|---|---|---|---|
| 1,557,945 | 1/1969 | France | 260—281 |

DONALD G. DAUS, Primary Examiner

U.S. Cl. X.R.

260—295 M, 304, 305, 309, 309.5; 424—267, 269